United States Patent
Nozoe et al.

(10) Patent No.: US 9,001,485 B2
(45) Date of Patent: Apr. 7, 2015

(54) OVERVOLTAGE PROTECTION COMPONENT, AND OVERVOLTAGE PROTECTION MATERIAL FOR OVERVOLTAGE PROTECTION COMPONENT

(75) Inventors: Kenji Nozoe, Fukui (JP); Hideaki Tokunaga, Osaka (JP); Takeshi Iseki, Fukui (JP); Takashi Morino, Fukui (JP); Kouichi Yoshioka, Fukui (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 39 days.

(21) Appl. No.: 13/704,430

(22) PCT Filed: Aug. 25, 2011

(86) PCT No.: PCT/JP2011/004717
§ 371 (c)(1),
(2), (4) Date: Dec. 14, 2012

(87) PCT Pub. No.: WO2012/026121
PCT Pub. Date: Mar. 1, 2012

(65) Prior Publication Data
US 2013/0083440 A1 Apr. 4, 2013

(30) Foreign Application Priority Data

Aug. 26, 2010 (JP) ................................. 2010-189008
Feb. 9, 2011 (JP) ................................. 2011-025735

(51) Int. Cl.
*H02H 1/00* (2006.01)
*H02H 1/04* (2006.01)
(Continued)

(52) U.S. Cl.
CPC ............. *H02H 9/044* (2013.01); *H01C 7/1006* (2013.01); *H01C 17/06526* (2013.01)

(58) Field of Classification Search
CPC ........ H02H 9/041; H02H 9/046; H01L 29/408
USPC ............................................ 361/56, 91.1, 117
See application file for complete search history.

(56) References Cited

U.S. PATENT DOCUMENTS 7,981,325 B2 * 7/2011 Kosowsky et al. ............ 252/511
8,885,312 B2 * 11/2014 Sumi et al. .................... 361/112
(Continued)

FOREIGN PATENT DOCUMENTS

| CN | 101496113 A | 7/2009 |
| CN | 101496114 A | 7/2009 |

(Continued)

OTHER PUBLICATIONS

International Search Report for PCT/JP2011/004717 dated Nov. 15, 2011.
(Continued)

*Primary Examiner* — Thienvu Tran
*Assistant Examiner* — Christopher Clark
(74) *Attorney, Agent, or Firm* — Pearne & Gordon LLP

(57) ABSTRACT

An overvoltage protector includes a first discharging electrode, a second discharging electrode, and an overvoltage protection part provided between the first and second discharging electrodes. The overvoltage protecting part has an insulating property under a normal operation condition, and has a conductive property if an overvoltage is applied between the first and second discharging electrodes. The overvoltage protecting part is made of a mixture of resin having an insulation property, an inorganic compound having an insulating property, and metallic boride compound powder. The metallic boride compound powder has a high melting point therefore it is hardly melted. Under high temperatures causing the powder to melt, the powder is oxidized and loses conductivity, thus providing a high reliability.

12 Claims, 1 Drawing Sheet

(51) Int. Cl.
*H02H 3/22* (2006.01)
*H02H 9/00* (2006.01)
*H02H 3/20* (2006.01)
*H02H 9/04* (2006.01)
*H01C 7/10* (2006.01)
*H01C 17/065* (2006.01)

(56) References Cited

U.S. PATENT DOCUMENTS

| | | | |
|---|---|---|---|
| 2002/0167775 A1* | 11/2002 | Wetter et al. | 361/117 |
| 2008/0079533 A1* | 4/2008 | Liu et al. | 338/21 |
| 2010/0020454 A1* | 1/2010 | Hirobe et al. | 361/56 |
| 2010/0176484 A1 | 7/2010 | Asakura et al. | |
| 2010/0188791 A1* | 7/2010 | Nozoe et al. | 361/220 |
| 2013/0249379 A1* | 9/2013 | Walker et al. | 313/141 |

FOREIGN PATENT DOCUMENTS

| | | |
|---|---|---|
| CN | 101536190 A | 9/2009 |
| CN | 101536275 A | 9/2009 |
| JP | 06-077010 A | 3/1994 |
| JP | 2005-108865 A | 4/2005 |
| JP | 2005-191206 A | 7/2005 |
| JP | 2007-265713 A | 10/2007 |
| JP | 2008-085284 A | 4/2008 |
| JP | 2010-515239 A | 5/2010 |
| JP | 2010-165660 A | 7/2010 |
| JP | 2010-186742 A | 8/2010 |
| WO | 2008/016858 A1 | 2/2008 |
| WO | 2008/016859 A1 | 2/2008 |
| WO | 2008/036423 A2 | 3/2008 |
| WO | 2008/053717 A1 | 5/2008 |

OTHER PUBLICATIONS

Office Action issued in Chinese Patent Application No. 201180041368.7 dated Dec. 20, 2013.

\* cited by examiner

OVERVOLTAGE PROTECTION COMPONENT, AND OVERVOLTAGE PROTECTION MATERIAL FOR OVERVOLTAGE PROTECTION COMPONENT

This application is a U.S. national stage application of the PCT international application No. PCT/JP2011/004717.

TECHNICAL FIELD

This invention relates to an overvoltage protector for protecting an electronic component or an electronic circuit from overvoltage due to, e.g. static electricity, and an overvoltage protection material for the overvoltage protector.

BACKGROUND ART

A method for protecting an electronic component or an electronic circuit from overvoltage or static electricity is known, which an overvoltage protector is connected to a ground and one of an input terminal and an output terminal of the electronic component or apparatus to be protected. Such overvoltage protector functions as an insulator under a normal operation condition. Upon having an overvoltage applied, the protector has impedance greatly decreasing or discharges electricity inside the protector to become electrically conductive.

An example of the overvoltage protector includes an overvoltage protection material between a pair of electrodes is known. The overvoltage protection material functions as an insulator under a normal operation condition, but passes an overvoltage once the overvoltage is applied to it.

As one the overvoltage protection material, material containing metallic particles with a passive state layer formed thereon and resin mixed with the particles is known. (cf. Patent Literature 1)

As another overvoltage protection material, material containing one of a conductor and a semiconductor having a high aspect ratio dispersed into an aggregate in nanoscale and another one of conductive or semi-conductive material added thereto is known. (cf. Patent Literature 2)

As still another overvoltage protection material, material containing inorganic conductive material having 1 nm to 200 nm particle diameter dispersed discontinuously into insulating material is known. (cf. Patent Literature 3)

In recent years, an overvoltage protector having a high reliability is increasingly demanded. Specifically, a highly reliable overvoltage protector operating correctly upon receiving a high voltage or a repetitive overvoltage is demanded. This is because a required reliability level for electronic devices or electrical apparatus installing an overvoltage protector became high in every service place, application and use environment. This is also based on an expectation to enhance a safety factor or to secure a wide safety margin in the electrical apparatus by requesting the overvoltage protector to have a much higher reliability than was ordinarily requested. A severe reliability test is conducted in which a much higher voltage is applied repeatedly or a short pulse high voltage is successively applied.

Applying repetitive high voltage short pulses is a much rigorous test than applying an ordinary static electricity. But, such test is sometimes conducted to secure a higher safety factor of the electrical apparatus against overvoltage. When conducting such tests, however, metal particles in the overvoltage protection part formed between the pair of discharging electrodes of the overvoltage protector occasionally melts, causing a short circuit problem.

CITATION LIST

Patent Literature

Patent Literature 1: Japanese Patent Laid-Open Publication No. 2007-265713
Patent Literature 2: Japanese Patent Laid-Open Publication No. 2010-515239
Patent Literature 3: Japanese Patent Laid-Open Publication No. 2010-186742

SUMMARY

An overvoltage protector includes a first discharging electrode, a second discharging electrode, and an overvoltage protection part formed between the first and second discharging electrodes. The overvoltage protecting part has an insulating property under a normal condition where a voltage not higher than a predetermined voltage is applied between the first and second discharging electrodes. The overvoltage protecting part has a conductive property if a voltage higher than the predetermined voltage is applied to between the first and second discharging electrodes. The overvoltage protecting part is made of a mixture of resin having an insulating property, an inorganic compound having an insulating property and metallic boride compound powder. The average particle diameter of the metallic boride compound powder ranges from 0.5 μm to 3 μm.

Since the metallic boride compound powder, conductive powder in the overvoltage protecting part, has a high inciting point, the powder hardly melts even when an overvoltage is applied to it, therefore hardly causing a short circuit even when it is exposed to a rigorous experiment. Further, since the metallic boride compound powder is readily oxidized in high temperatures to be loses conductive, the compound powder is hardly short-circuited even when an overvoltage causing the powder to melt down is applied to it.

DESCRIPTION OF EMBODIMENT

Figure 1:
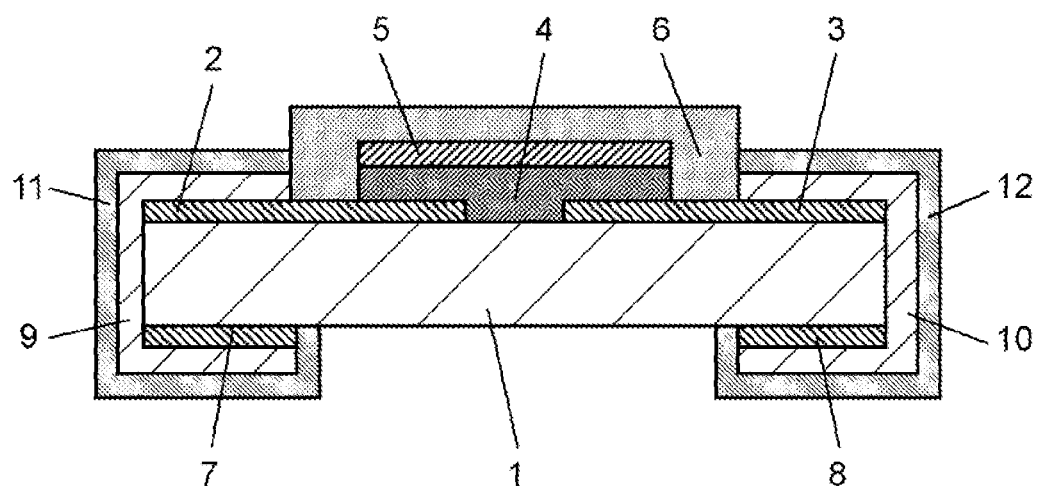
FIG. 1 is a front cross sectional view of an overvoltage protector according to an exemplary embodiment.

An exemplary embodiment of the present invention be described below with referring to drawings. FIG. 1 is a front cross sectional view of an overvoltage protector according to the embodiment.

As shown in FIG. 1, the overvoltage protector according to the embodiment includes insulating substrate 1, first discharging electrode 2, second discharging electrode 3, overvoltage protecting part 4, intermediate layer 5, protective layer 6, back side electrodes 7 and 8, edge electrodes 9 and 10 and metallic layers 11 and 12. Insulating substrate 1 has an electrical insulating property and a thermal resistance property, and is made of alumina. First discharging electrode 2 and second discharging electrode 3 are formed on insulating substrate 1 and have respective distal ends facing each other. First discharging electrode 2 and second discharging electrode 3 are electrically conductive. First discharging electrode 2 and second discharging electrode 3 may be made of, e.g. gold having preferable the stability, copper having a high conductivity, or tungsten having a high melting-point for high heat resistivity. According to this embodiment, first discharging electrode 2 and second discharging electrode 3 are made of CuNi alloy.

First discharging electrode 2 and second discharging electrode 3 are manufactured as follows. First, CuNi alloy paste is printed and fired on the insulating substrate where first discharging electrode 2 and second discharging electrode 3 are to be formed as well as in-between first discharging electrode 2 and second discharging electrode 3 to be formed. Then, first discharging electrode 2 and second discharging electrode 3 are irradiated with laser beam to be separated. First discharging electrode 2 and second discharging electrode 3 have thicknesses ranging from 5 μm to 10 μm. If first discharging electrode 2 and second discharging electrode 3 are too thin, rigorous repetitive discharge test is likely to damage one specific point of first discharging electrode 2 and second discharging electrode 3 locally, melting the damaged point. However, by thickening first discharging electrode 2 and second discharging electrode 3 as above, damage due to the rigorous discharge test is reduced, as a result reducing danger of melting electrode 2 and electrode 3. The distance between first discharging electrode 2 and second discharging electrode 3 ranges from 6 μm to 10 μm. This is so called a gap distance. The shorter the distance is, the not higher a discharge starting voltage is. Having the thicknesses ranging from 5 μm to 10 μm, first discharging electrode 2 and second discharging electrode 3 may be produced with a thick film manufacturing method, such as printing.

Overvoltage protecting part 4 fills between first discharging electrode 2 and second discharging electrode 3. Overvoltage protecting part 4 has an insulating property under a normal condition where a voltage not higher than a predetermined voltage is applied between first discharging electrode 2 and second discharging electrode. Overvoltage protecting part 4 has a conductive property if an overvoltage higher than the predetermined voltage is applied between first discharging electrode 2 and second discharging electrode 3. The predetermined voltage is decided depending on material or composition of overvoltage protecting part 4 and the distance between first electrode 2 and second electrode 3.

Intermediate layer 5 is made of resin such as silicone and is formed on overvoltage protecting part 4. Intermediate layer 5 absorbs an impact of an overvoltage applied to overvoltage protecting part 4.

Protective layer 6 covers overvoltage protecting part 4 and intermediate layer 5 to protect overvoltage protecting part 4 and intermediate layer 5 from, e.g. a mechanical shock and humidity.

Back side electrode 7 and back side electrode 8 are formed on a surface opposite to an upper surface of insulating substrate 1 on which first discharging electrode 2 and second discharging electrode 3 are formed, and namely, back side electrodes 7 and 8 are formed on a lower surface of insulating substrate 1.

Edge electrode 9 extends from an upper edge of insulating substrate to a lower edge of insulating substrate 1 via a side surface of insulating substrate 1, and connects first discharging electrode 2 with back side electrode 7. Similarly, edge electrode 10 extends from an upper edge of insulating substrate 1 to a lower edge of insulating substrate 1 via a side surface of insulating substrate 1, and electrically connects second discharging electrode 3 with back side electrode 8.

Metallic layer 11 is made of a Ni-plating on a surface of edge electrode 9 and a Sn-plating an the Ni plating and covers edge electrode 9. Similarly, metallic layer 12 is made of a Ni plating on a surface of edge electrode 10 and a Sn plating on the Ni plating, and covers edge electrode 10.

Overvoltage protecting part 4 will be detailed below. Overvoltage protecting part 4 is made of overvoltage protection material of a mixture of resin having an insulating property, an inorganic compound having an insulating property, and metallic boride compound powder. According to the embodiment, the resin is silicon. More specifically, overvoltage protecting part 4 is made of silicone resin, metallic boride compound powder, and the inorganic compound having an insulating property. The metallic boride compound powder and the inorganic compound are dispersed into silicone resin. For the insulating inorganic compound, oxide substance, such as $Al_2O_3$ or $SiO_2$, having superior insulating property and heat conductive property is suitable. In the case that high heat conductivity is required, non-oxide substance, such as AlN, BN, and $Si_3N_4$, may be employed as the inorganic compound The relation between an overvoltage characteristic and the average particle diameter of metallic boride compound powder will be described below. The overvoltage characteristic is evaluated by a peak voltage, one of indicator of static electricity suppression characteristics. Experimental condition is as defined in IEC61000-4-2. In the experimentation, overvoltage protection samples having an average particle diameter of 0.4 μm, 0.5 μm, 1.0 μm, 1.5 μm, 2.0 μm, 3.0 μm, and 5.0 μm were prepared. Then, the voltage of 8 kV was applied to each sample by a contact discharging method, and then, the peak voltage is measured in a protective circuit. Samples having a peak voltage exceeding 500 V are judged as having insufficient overvoltage suppression characteristic. Samples having a peak voltage ranging from 400 V to 500 V are evaluated as having preferable suppression characteristic. Samples having a peak voltage not higher than 400 V are determined to be excellent. Table 1 shows the results. The metallic boride compound powder used in the experiment was $LaB_6$. The average particle diameter of the powder was measured with the Fisher Method or FSS (Fisher Sub Sieve Sizer)

TABLE 1

| Particle Diameter (μm) | Peak Voltage (V) | Judgment |
|---|---|---|
| 0.4 | 580 | Insufficient |
| 0.5 | 470 | Preferable |
| 1.0 | 360 | Excellent |
| 1.5 | 370 | Excellent |
| 2.0 | 385 | Excellent |
| 3.0 | 480 | Preferable |
| 5.0 | 700 | Insufficient |

The experiment result shows that metallic boride compound powder having an average particle diameter ranging from 0.5 μm to 3 μm is preferable, and the powder having an average diameter ranging from 1 μm to 2 μm is excellent in suppressing overvoltage. Metallic boride compound powder having the average particle diameter ranging from 1 μm to 2 μm can be easily grinded into fine particles, thus being easily formed into overvoltage protecting part 4 preferably by printing. The metallic boride compound powder is superior since it has a high melting point and a high conductivity. The metallic boride compound powder is obtained by grinding metallic boride compound by a ball milling method or a jet milling method.

An operation of the overvoltage protector will be described below.

First discharging electrode 2 of the overvoltage protector is connected to an input side of an electronic circuit to be protected while second discharging electrode 3 is connected to a ground of the circuit. Overvoltage protecting part 4 functions as an insulator at a normal operation time when no overvoltage is applied. At this moment, no current flow from first discharging electrode 2 to second discharging electrode 3, and instead, an electric signal flows into the input side of the electronic circuit.

Under the above connection, when an overvoltage due to, e.g. static electricity is applied to the input side of the electronic circuit, the electrical potential at first discharging electrode 2 increases, and causes an overvoltage between the first discharge electrode and the second discharging electrode 3 at a ground potential. In this case, overvoltage protecting part 4 functions as a conductor to allow the electricity to pass thereto. A current caused by the overvoltage does not flow into the input side of the circuit to be protected, but flows from first discharging electrode 2 through overvoltage protecting part 4 to second discharging electrode 3, thereby protecting the electronic circuit. To protect the electronic circuit efficiently from the overvoltage, the concentration of metallic boride compound powder in the overvoltage protection material may range preferably from 10 vol. % to 50 vol. %. In the case that the concentration of metallic boride compound powder in the protection material is lower than this level, when an overvoltage is applied, the current caused by the overvoltage hardly flows from first discharging electrode 2 to second discharging electrode 3 through overvoltage protecting part 4. On the other hand, in the case that the concentration of metallic boride compound powder in the protection material is higher than above, the current easily flows through the overvoltage protecting part even at a normal time when the overvoltage is not applied, deteriorating the insulating resistance. The concentration of the mixture in overvoltage protecting part 4 according to the embodiment is 20 vol. % of the $LaB_6$ metallic boride compound powder, 40 vol. % of the $Al_2O_3$ insulating inorganic compound, and 40 vol. % of the insulating silicone resin.

A state of overvoltage protecting part 4 to which an overvoltage is applied will be detailed below. Overvoltage protecting part 4 is made by dispersing the metallic boride compound powder into silicon, an insulating material. Since the metallic boride compound powder is conductive, if an overvoltage is applied between first discharging electrode 2 and second discharging electrode 3, electrical discharge occurs between first discharging electrode 2 and second discharging electrode 3 through the metallic boride compound powder. Thus, the current caused by the overvoltage flows from first discharging electrode 2 to second discharging electrode 3.

When the electric discharge occurs between first discharging electrode 2 and second discharging electrode 3, a considerable amount of heat is generated at the point where the discharge occurs, and damages the conductive powder in overvoltage protecting part 4. However, since the metallic boride compound powder has a high melting point, the conductive powder hardly melts with the heat of the electric discharge. Accordingly, the electric discharge current flowing from first discharging electrode 2 to second discharging electrode is reduced, therefore reducing a risk of short circuit even during the rigorous experiment. Further, since the metallic boride compound powder is easily oxidized in high temperatures to lose conductivity, even if an overvoltage melting the metallic boride compound powder is applied, short circuit is prevented.

$TiB_2$ (titanium diboride) used for the metallic compound powder further enhances a reliability. $TiB_2$ has a high melting point of about 3,000° C. is chemically stable, and hardly oxidized at a room temperature, but it is oxidized at high temperatures to lose conductivity, which is a distinctive characteristic of this material. Namely, when $TiB_2$ is exposed to such a high temperature as to be melted, $TiB_2$ is oxidized and loses conductivity. Thus, when a $TiB_2$ particle in overvoltage protecting part 4 melts and contacts an adjacent $TiB_2$ particle, the melting $TiB_2$ particle is oxidized successively to produce $TiO_3$ and $B_2O_3$. Thus, overvoltage protecting part 4 becomes non-conductive, hardly causing a short circuit.

As the metallic boride compound powder, $ZrB_2$, a compound of Zr which is one of titanium group like Ti is may be employed. Since $ZrB_2$ has a higher melting point than $TiB_2$, $ZrB_2$ prevents short circuit more effectively. Further, as the metallic boride compound powder, a mixture of $TiB_2$ powder and $ZrB_2$ powder may be employed as well.

Still further, $LaB_6$ may be used as the metallic boride compound powder. $LaB_6$ has more number of boron per metal atom than $TiB_2$. $LaB_6$ produces more insulating material. $B_2O_3$, accordingly upon being oxidized, effectively suppressing a short circuit. The metallic boride compound powder may contain at least one of $TiB_2$, $ZrB_2$, and $LaB_6$.

As described above, in the overvoltage protector according to the embodiment, the metallic boride compound powder, a conductor in overvoltage protecting part 4, hardly melts even when it is subjected to a rigorous repetitive experiment. When the powder melts, or even when the powder does not melt, the powder is oxidized in high temperatures to become non-conductive, hardly causing a short circuit.

Overvoltage protection material of overvoltage protecting part 4 employed in the overvoltage protector is thus used for the overvoltage protector for preventing the overvoltage protector from being short-circuited and therefore, is useful.

Performance of four kinds of overvoltage protectors using: $TiB_2$, $ZrB_2$, and $LaB_6$ as the metallic boride compound powder, and a unit using Al powder instead of the metallic boride compound powder will be described below.

Experimental condition is per IEC-61000-4-2, where aerial discharge is made repeatedly, ten times, with the applied voltages of +15 V and −15 V. Insulating resistance is then measured. The insulating resistance smaller than 1 MΩ is judged as short-circuited. The test results are shown in Table 2.

TABLE 2

| Material | Number of Short-Circuited Samples per 20 Samples | Minimum Value of Insulating Resistance |
| --- | --- | --- |
| Al | 8/20 | 1 Ω |
| $ZrB_2$ | 0/20 | 70M Ω |
| $TiB_2$ | 0/20 | 33M Ω |
| $LaB_6$ | 0/20 | 150M Ω |

As is shown in the test results, in the overvoltage protector using the Al powder, 8 pieces out of 20 pieces were short-circuited. The minimum insulating resistance among 20 pieces was 1Ω.

In the overvoltage protector using $TiB_2$, none of 20 pieces was short-circuited. The minimum insulating resistance among 20 pieces was 33 MΩ.

In overvoltage protector using $ZrB_2$, none of 20 pieces was short-circuited. The minimum insulating resistance among 20 pieces was 70 MΩ.

In the overvoltage protector using $LaB_6$, none of 20 pieces was short-circuited either. The minimum insulating resistance among 20 pieces was 150 MΩ.

The experiment results show that the short circuit hardly occurs if the metallic boride compound powder is used, and the insulating resistance becomes very high if $LaB_6$ is used. In the experiment, the average diameter of the metallic boride compound powder and the Al powder in the overvoltage protection part ragged from 1 µm to 2 µm.

If the average particle diameter of the metallic boride compound powder is excessively small, the powder has a small heat capacity, and is easily heated up by a high energy of electric discharge to become an insulator, disabling electric charge to pass again. The electric charge caused by the overvoltage then flows on another route, another metallic boride compound powder to pass thorough. However, since the other metallic boride compound powder is also readily oxidized at high temperatures, the route is closed after that. This repeated process lengthens a discharge route of the overvoltage, changing a discharge characteristic of the part. Further, the metallic boride compound powder forms an insulating oxide film on its surface. Therefore, if the average particle diameter of the metallic boride compound powder is small, the insulating oxide film formed on its surface raises electric resistance of the metallic boride compound powder. Static electricity suppression characteristic of overvoltage protecting part 4 accordingly deteriorates, in other words, its peak voltage increases.

On the other hand, if the average particle diameter of the metallic boride compound powder becomes larger, number of metallic boride compound powder that allows electric discharge to pass between first discharging electrode 2 and second discharging electrode 3 becomes smaller, as long as the volume percentage of metallic boride compound powder in overvoltage protecting material of part 4 is constant. The distances among particles of the metallic boride compound powder therefore becomes large, having static electricity suppression characteristic deteriorate.

Figure 2:
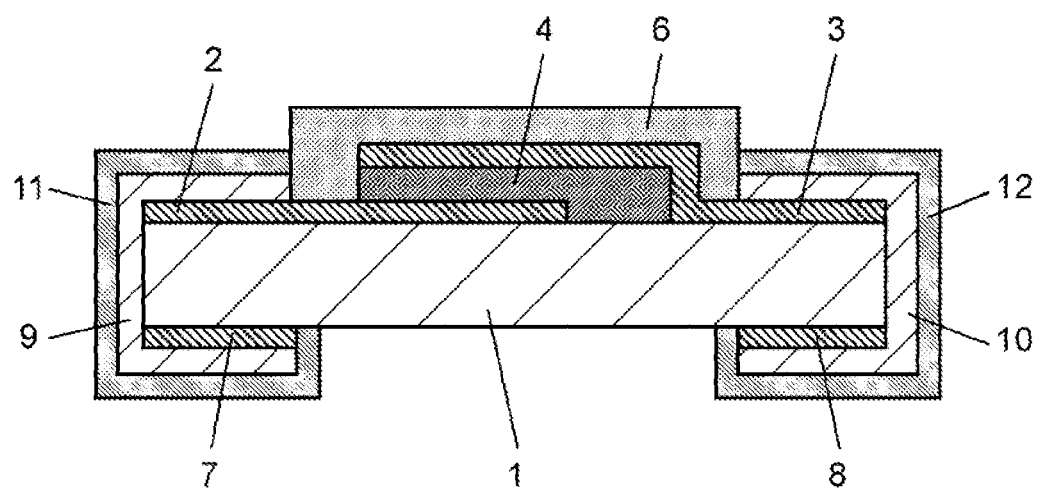
FIG. 2 is a front cross sectional view of another overvoltage protector according to the embodiment.

Configuration of the overvoltage protector is not limited to that in FIG. 1, and other configuration may be allowed. FIG. 2 is a front cross sectional view of another overvoltage protector according to the embodiment. In FIG. 2, components identical to those in FIG. 2 are denoted by the same reference numerals. Differences of the overvoltage protector shown in FIG. 2 from the overvoltage protector shown in FIG. 1 are in that a surface of first discharging electrode 2 faces a surface of second discharging electrode 3 while a distal end of the first electrode does not face the distal end of the second electrode, and that intermediate layer 5 is not included in the overvoltage protector shown in FIG. 2.

The overvoltage protector shown in FIG. 2 exhibits a similar performance to that of the configuration shown in FIG. 1.

According to the embodiment, the overvoltage protecting part is made of a mixture of insulating resin, an inorganic compound having an insulation property, and metallic boride compound powder. But, the metallic boride compound powder may be dispersed into an insulating ceramic or glass. Such configuration further enhances thermal resistance. In this configuration, however, at least one of $TiB_2$, $ZrB_2$, and $LaB_6$ may be preferably used as the metallic boride compound powder, as in the case where the insulating resin is employed.

INDUSTRIAL APPLICABILITY

An overvoltage protector and an overvoltage protection material used for the overvoltage protector according to the invention protect electronic components and electronic circuits from overvoltage, and are industrially useful.

REFERENCE MARKS IN THE DRAWINGS

1 Insulating Substrate
2 First Discharging Electrode
3 Second Discharging Electrode
4 Overvoltage Protecting Part
5 intermediate Layer
6 Protective Layer
7, 8 Back Side Electrode
9, 10 Edge Electrode
11, 12 Metallic Layer

The invention claimed is:

1. An overvoltage protector comprising:
a first discharging electrode;
a second discharging electrode; and
an overvoltage protection part provided between the first discharging electrode and the second discharging electrode,
wherein the overvoltage protecting part has an insulating property under a normal operation condition where a voltage not higher than a predetermined voltage is applied between the first discharging electrode and the second discharging electrode, and has a conductive property if an overvoltage higher than the predetermined voltage is applied between the first discharging electrode and the second discharging electrode,
wherein the overvoltage protecting part contains a mixture of resin having an insulation property, an inorganic compound having an insulating property, and metallic boride compound powder,
wherein an average particle diameter of the metallic boride compound powder ranges from 0.5 µm to 3 µm, and
wherein the metallic boride compound powder contains $LaB_6$.

2. The overvoltage protector according to claim 1, wherein both the first discharging electrode and the second discharging electrode are made of CuNi alloy and have thicknesses ranging from 5 µm to 10 µm.

3. An overvoltage protection material for an overvoltage protector, comprising a mixture of resin having an insulating property, an inorganic compound having an insulating property, and metallic boride compound powder having an average particle diameter ranging from 0.5 µm to 3 µm,
wherein a concentration of the metallic boride compound powder in the overvoltage protection material ranges from 10 vol. % to 50 vol. %,
wherein, said overvoltage protection material has an insulating property under a normal operation condition where a voltage not higher than a predetermined voltage is applied thereto, and has a conductive property if a voltage higher than the predetermined voltage is applied thereto, and
wherein the metallic boride compound powder contains $LaB_6$.

4. An overvoltage protector comprising:
a first discharging electrode;
a second discharging electrode; and
an overvoltage protection part provided between the first discharging electrode and the second discharging electrode,
wherein the overvoltage protecting part has an insulating property under a normal operation condition where a voltage not higher than a predetermined voltage is applied between the first discharging electrode and the second discharging electrode, and has a conductive property if an overvoltage higher than the predetermined voltage is applied between the first discharging electrode and the second discharging electrode, wherein the overvoltage protecting part contains a mixture of resin having an insulation property, an inorganic compound having an insulating property, and metallic boride compound powder, wherein an average particle diameter of the metallic boride compound powder ranges from 0.5 μm to 3 μm, and wherein the metallic boride compound powder contains $ZrB_2$.

5. The overvoltage protector according to claim 1, wherein a concentration of the metallic boride compound powder in the overvoltage protection material ranges from 10 vol. % to 50 vol. %.

6. The overvoltage protector according to claim 1, wherein the resin comprises silicone resin.

7. The overvoltage protector according to claim 1, wherein, in the overvoltage protecting part, the inorganic compound and the metallic boride compound powder are dispersed in the resin.

8. The overvoltage protection material according to claim 3, wherein the resin comprises silicone resin.

9. The overvoltage protection material according to claim 3, wherein, in the overvoltage protecting part, the inorganic compound and the metallic boride compound powder are dispersed in the resin.

10. The overvoltage protector according to claim 4, wherein a concentration of the metallic boride compound powder in the overvoltage protection material ranges from 10 vol. % to 50 vol. %.

11. The overvoltage protector according to claim 4, wherein the resin comprises silicone resin.

12. The overvoltage protector according to claim 4, wherein, in the overvoltage protecting part, the inorganic compound and the metallic boride compound powder are dispersed in the resin.

* * * * *